United States Patent [19]

Bellamy et al.

[11] 3,996,388
[45] Dec. 7, 1976

[54] PROCESS OF MAKING A WAFFLE BATTER

[76] Inventors: William R. Bellamy, 2775 Duke of Gloucester Drive; Robert H. Brooks, 3073 Duke of Gloucester Drive, both of East Point, Ga. 30344

[22] Filed: Aug. 13, 1975

[21] Appl. No.: 604,439

[52] U.S. Cl. .................................................. 426/552
[51] Int. Cl.² ............................................. A21D 10/04
[58] Field of Search .................... 426/552, 553, 601

[56] References Cited
UNITED STATES PATENTS

| | | | |
|---|---|---|---|
| 2,870,026 | 1/1959 | Keeler et al. | 426/553 |
| 3,649,304 | 3/1972 | Fehr et al. | 426/553 |
| 3,753,734 | 8/1973 | Kaplow et al. | 426/553 |

*Primary Examiner*—Raymond N. Jones

[57] ABSTRACT

A waffle batter and process of preparing same including the steps of forming a skim milk suspension, heating the suspension to a first temperature; adding a vegetable fat material with a melting point below the first temperature to form a base mix; revising the temperature of the mix to a second temperature to cook; homogenizing the mix; rapidly cooling to below 40° F.; mixing in at between 36° F. and 40° F. baking powder, eggs fluffed to greater than their original volume, salt, sugar and shortening; blending in flour.

4 Claims, 1 Drawing Figure

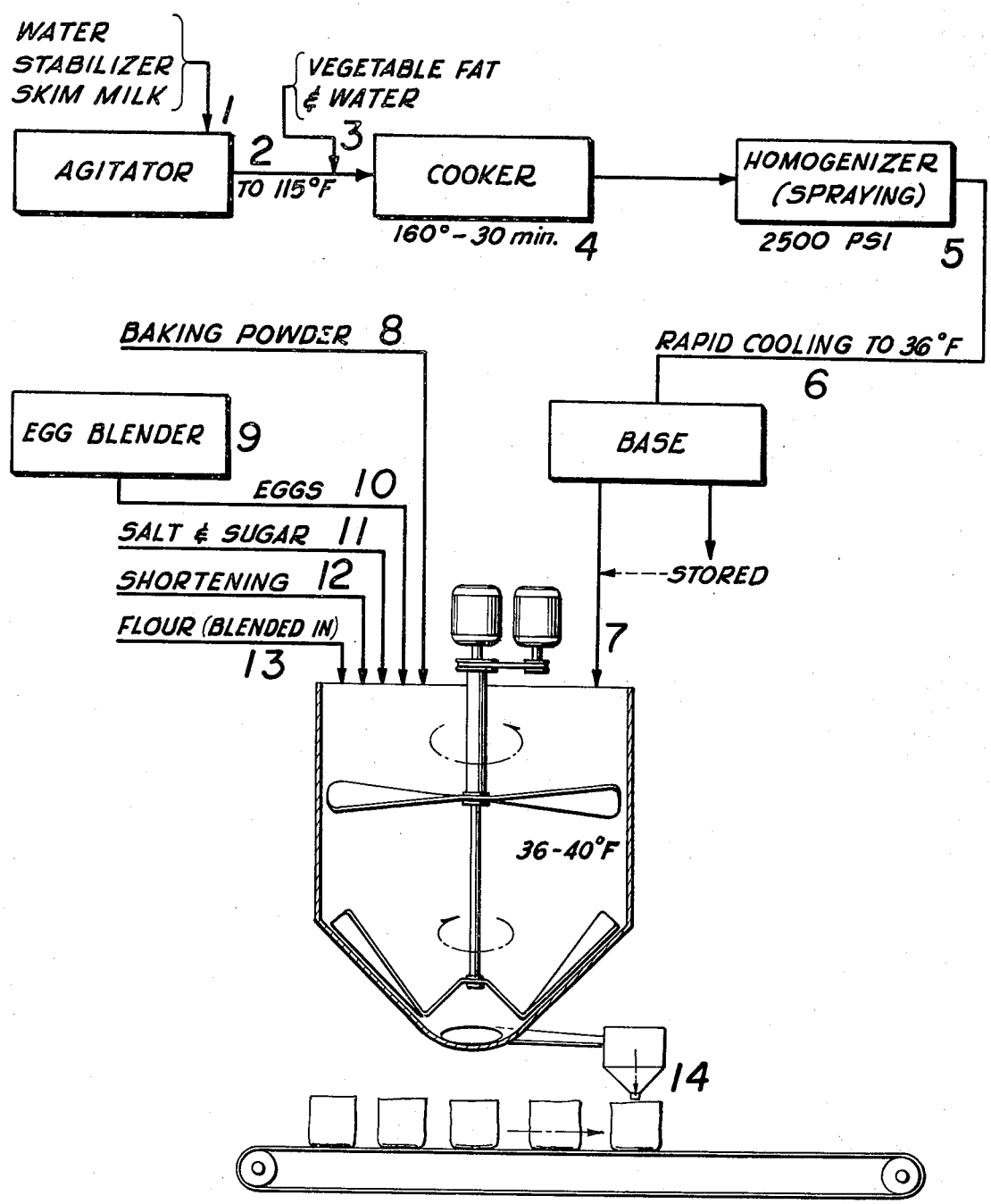

PROCESS OF MAKING A WAFFLE BATTER

BACKGROUND OF THE INVENTION

1. Field of the Invention

The invention relates to pre-mixed batters, particularly waffle batters and a process of making same.

2. Description of the Prior Art

It is known in the baking art to premix several or all of the ingredients which comprise a waffle batter. Best results are achieved when the stirring of the dough is minimized, since stirring of any intermediate or final mix already containing the flour causes toughness in the final product. It is also conventional to blend the eggs separately before they are added to the mix.

Dry or powdered milk, particularly non-fat or skim milk, is desirable for a low fat final batter. It is particularly desirable to avoid saturated fats. However, difficulties have arisen in dissolving the non-fat dry milk.

A fat or oil component is desirable in the final batter for taste, consistency and proper release of the final product from the waffle iron. Again, oils low in saturated fats are desirable, but the above properties are not achieved when only liquid shortening is used. Solid fats prove hard to dissolve and may require excessive mixing.

Therefore, in order to have sufficiently viscous fats and shortening and in order to take advantage of convenient non-fat or skim dry milk, excessive mixing has been required at various stages of previous waffle batter preparations. Control of critical ingredient percentages is, of course, lost whenever a particular ingredient remains in undissolved or undispersed form a whenever an ingredient settles out.

SUMMARY OF THE INVENTION

Briefly described, the process includes the steps of forming a milk suspension from water, stabilizer and milk powder; heating the milk suspension to a first temperature; adding to the heated milk suspension a fat material having a melting point below the first temperature; diluting the suspension with water to form a base mix; cooking the base mix; homogenizing the cooked base mix; rapidly cooling the base mix to below 40° F to form a base; further mixing with said base at between 36° F and 40° F the ingredients: baking powder, eggs fluffed to greater than their original volume, salt, sugar and liquid shortening to form a final mix; and blending flour into the final mix to form a batter; and the batter so prepared.

It is therefore a principal object of the invention to provide uniformity to a premixed batter, avoiding the toughness caused by excessive mixing.

It is another object of the invention to give proper release properties to a premixed waffle batter.

It is another object of the invention to reduce final mixing time by providing a storable intermediate base which contains the ingredients of the batter requiring slow processing.

Other objects will become apparent from the following description and figure wherein:

BRIEF DESCRIPTION OF THE DRAWING

The FIGURE is a schematic diagram of an overall process according to one embodiment of the present invention.

DETAILED DESCRIPTION OF THE INVENTION

Referring to FIG. 1, the waffle batter is prepared in two stages. First in Steps 1–6, a base is prepared using the ingredients shown in Table I for a one hundred gallon batch of base. Second, in Steps 7–13, a batter is prepared using the amounts shown in Table II with the base having been prepared in accordance with Table I.

TABLE I

| INGREDIENT | MINIMUM QUANTITY | BASE PREFERRED AMOUNT | MAXIMUM QUANTITY | PERCENTAGES |
|---|---|---|---|---|
| Water | 605.7 No. | 645.7 (77 gal.) | 685.7 | 74%–78% |
| Stabilizer | 2.80 | 3.30 | 3.80 | .31%–.47% |
| Skim Milk Powder | & — | 87 | & — | 9.7%–10.8% |
| Vegetable Fat | & 105 | 110 | & 115 | 11.9%–14.1% |
| Total | | 855 (100 gal.) | | |

TABLE II

| INGREDIENT | MINIMUM QUANTITY | BATTER PREFERRED AMOUNT | MAXIMUM QUANTITY | PERCENTAGES |
|---|---|---|---|---|
| Base | 1690 No. | 1740 | 1790 | 52%–55% |
| Baking Powder | 46 | 50 | 54 | 1.3%–1.7% |
| Blended Eggs | 190 | 200 | 210 | 5.7%–6.6% |
| Salt | 10 | 17 | 20 | 0.30%–.64% |
| Sugar | 185 | 200 | 215 | 5.5%–6.8% |
| Shortening | 185 | 200 | 215 | 5.5%–6.8% |
| Flour | — | 850 | — | 25%–27% |
| Total | | 3257 (407 gal.) | | |

The base is prepared by filling a mixer or agitator to a convenient level with water, preferably with the water just covering the mixer blades. Skim milk powder and stabilizer are added in Step 1 while simultaneously agitating. The skim milk powder used contains non-fat dry milk solids with most of the milk fat removed. The stabilizer is used to hold the milk solids and fat, later introduced, in suspension. In the specific process embodiment illustrated in Table I, the stabilizer is Apex Stabilizer, manufactured by Germantown Manufacturing Company.

Xanthan or guar gum may be substituted for the Apex stabilizer using 1 pound of gum for each 3.3 pounds of Apex.

In Step 2, the milk suspension is heated up to a first temperature, illustrated as at least 115° F. In Step 3, vegetable fat is added at the first temperature selected so that the melting point of the vegetable fat is exceeded. Some stirring may occur during these steps, but it is not strictly necessary.

The vegetable fat added in Step 3 is selected to give the waffle batter many of the same properties as if milk fat were used, but without necessarily the same high content of saturated fats and with better release from the waffle iron. The vegetable fat is selected for properties such as lubrication and melting point, and contributes to the consistency and taste of the waffles. The vegetable fat used in the embodiment illustrated in Table I is MiraFlo 18 manufactured by Anderson Clayton Foods.

The base so prepared is then heated in Step 4 to about 160° F to cook for 30 minutes to thoroughly dissolve the skim milk and vegetable fat and to maintain both ingredients uniformly in solution throughout the remainder of the process.

The base is then homogenized in Step 5 by conventional techniques, using a setting of 2500 psi, as by setting a first stage to 2,000 and a second stage to 500.

Step 6, rapid cooling to below 40° F, prevents the base from spoiling and apparently also contributes to the uniformity of the base and eventual batter. Such rapid cooling also cooperates with earlier steps which thoroughly dissolve and disperse the ingredients to prevent settling during the cooling step.

The base so prepared may be kept for a short period either fresh or frozen. In commercial operation, the base is prepared fresh each day for multiple batter mixes or sometimes used the day following base preparation.

The base is then added to a mixing vat, Step 7, and several ingredients are mixed in, Steps 8–13. It is important to keep the temperature from falling below 36° C or thereabouts to prevent settling, but because baking powder is soon added and will react in warm batter, temperatures above 40° F are also undesirable. The base is continuously stirred at variable speeds by one or more blades as other ingredients are added.

In Step 8, multiple action baking powder is added. The baking powder is blended, stirred or mixed in early to ensure its complete dispersion; and addition of baking powder after only the base, or after only the base and eggs is desirable.

In Step 9, eggs are fluffed, beaten or whipped to at least 200% of original volume. Any less beating results in an inferior product.

In Step 10, the eggs are added to the mixing vat in which stirring is continuing to occur.

In Step 11, salt and sugar are added. Cane sugar is preferred. Variations from the percentages of sugar shown in Table I cause improper browning of the waffles, with too little sugar causing insufficient browning and too much causing the waffles to blacken.

In Step 12, the shortening is added. Easily dispersed liquid shortening such as liquid margarine is usable because the vegetable fat in the base can, in cooperation with the shortening, provide sufficient release of the final product from a waffle iron.

Flour is blended in Step 13. It has been found desirable to use a flour blend of winter and spring wheat to give proper absorption and other properties. "Safeguard" flour (manufactured by Peavy Company) has proved particularly useful because its protein content of about 11.2% provides sufficient moisture uptake. It has 0.46% ash and 61.6% absorption.

Because the flour is added last, it receives the least stirring and thus "toughness" is avoided. Because of the uniformity already achieved in preparing the base and mixing in the other ingredients, less stirring after the flour has been added is required than is true for conventional processes. A short period of stirring will suffice to coat the flour particles with egg and other ingredients. Once the flour is stirred in, the product can be dispersed (in Step 14) into containers and then shipped fresh or frozen.

A batter prepared according to the process embodiment illustrated in the drawing and Tables I and II has a shelf life of 60 days if frozen and 10–12 days if stored fresh below 40° F. Care must be taken in thawing frozen batter to avoid temperatures greater than 40° F for any portion of the batter; otherwise some rising may occur.

It should, of course, be understood that the above described embodiment merely illustrates the invention in selected form. Many modifications may, of course, be made in product or process without departing from the spirit of the invention which is set out in varying scope in the appended claims.

What is claimed is:
1. A process for preparing a waffle batter comprising the steps:
  a. Forming a milk suspension of water, a stabilizer and skim milk powder;
  b. Bringing said milk suspension to a first temperature;
  c. Adding to the milk suspension at the first temperature a vegetable fat material having a melting point below said first temperature to form a base mix;
  d. Heating said base mix to a second temperature of at least 160° F to cook said base mix;
  e. Homogenizing said cooked base mix;
  f. Rapidly cooling said base mix to below 40° F to form the base;
  g. Mixing with said base the ingredients: (1) baking powder; (2) eggs fluffed to greater than their original volume; (3) salt and sugar and (4) shortening to form a last mix, said mixing occurring at a temperature between 36° F and 40° F;
  h. Blending flour into said last mix to form the batter; said base containing by weight percentage 74–78% water, 0.3–0.5% stabilizer, 9.7–10.8% skim milk powder and 11.9–14.1% vegetable fat material; said batter containing by weight percentage 52–55% base, 1.3–1.7% baking powder, 5.7–6.6% eggs fluffed to at least 200% of their original volume, 0.30–0.64% salt, 5.5–6.8% sugar, 5.5–6.8% shortening, and 25–27% flour; and said batter being 48–50% solids and 50–52% liquids.

2. A process as claimed in claim 1 wherein said base contains as stabilizer 0.09–01.14% by weight of a material selected from the group consisting of xanthan gum and guar gum.

3. A process as claimed in claim 1 wherein the ingredients mixed in during said mixing step are added in the order listed.

4. A process of preparing a waffle batter base comprising the steps:

a. Agitating with a first amount of water a predetermined amount of stabilizer and milk powder to form a milk solution;
b. Heating said milk solution to a first temperature;
c. Adding a vegetable fat material having a melting point below said first temperature;
d. Diluting with a second amount of water, the sum of said first and second amounts being a predetermined amount, to form a base;
e. Exposing the base to a temperature of at least 160° F for a sufficient period of time to cook the base;
f. Homogenizing the cooked base at about 2500 psi; and
g. Cooling the homogenized base to below 40° F, said waffle batter base containing by weight percentage 74–78% water, 0.3–0.5% stabilizer, 9.7–10.8% skim milk powder and 12.4–14.7% vegetable fat material.

* * * * *